United States Patent
Dumont et al.

(10) Patent No.: US 10,331,824 B2
(45) Date of Patent: Jun. 25, 2019

(54) DYNAMICALLY LOADED SYSTEM-LEVEL SIMULATION

(71) Applicant: Synopsys, Inc., Mountain View, CA (US)

(72) Inventors: Olivier P. F. Dumont, Herent (BE); Thomas M. Philipp, Meerbusch (DE)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/406,555

(22) Filed: Jan. 13, 2017

(65) Prior Publication Data

US 2017/0132345 A1 May 11, 2017

Related U.S. Application Data

(63) Continuation of application No. 14/563,370, filed on Dec. 8, 2014, now Pat. No. 9,582,623.

(Continued)

(51) Int. Cl.
*G06F 17/50* (2006.01)

(52) U.S. Cl.
CPC ........ *G06F 17/5022* (2013.01); *G06F 17/504* (2013.01); *G06F 17/5036* (2013.01); *G06F 17/5081* (2013.01); *G06F 17/5045* (2013.01); *G06F 17/5068* (2013.01); *G06F 2217/86* (2013.01)

(58) Field of Classification Search
None
See application file for complete search history.

(56) References Cited

U.S. PATENT DOCUMENTS

| 6,314,338 | B1 | 11/2001 | Billington |
| 6,862,600 | B2 | 3/2005 | Croix et al. |

(Continued)

OTHER PUBLICATIONS

R. Vitali et al., "Towards Symmetric Multi-threaded Optimistic Simulation Kernels," 2012 IEEE Computer Society, pp. 211-220.*

(Continued)

*Primary Examiner* — Leigh M Garbowski
(74) *Attorney, Agent, or Firm* — Fenwick & West LLP

(57) ABSTRACT

A system-level simulation includes generating netlist information including component library information, which describes instances of the hardware components, and component instance information, which describes component dynamic libraries that include models of hardware components. The simulation is generated at simulation run-time based on the netlist information. Component dynamic libraries corresponding to the component library information are loaded based on the component library information. A simulation dynamic library referenced by the component dynamic libraries is loaded. One or more interlibrary adapters corresponding to the component dynamic libraries are loaded to provide compatibility between the component dynamic libraries and an application binary interface of the simulation dynamic library. Instances of hardware components are instantiated based on the component instance information, and the instantiated instances of the hardware components are connected to form the simulation. The simulation is performed at simulation run-time responsive to the simulation being generated.

20 Claims, 8 Drawing Sheets

Related U.S. Application Data

(60) Provisional application No. 62/082,880, filed on Nov. 21, 2014, provisional application No. 61/939,165, filed on Feb. 12, 2014.

(56) References Cited

U.S. PATENT DOCUMENTS

| | | | |
|---|---|---|---|
| 7,370,312 B1 | 5/2008 | Steckel | |
| 7,392,169 B2* | 6/2008 | Gabele | G06F 17/5022 |
| | | | 703/13 |
| 7,433,813 B1 | 10/2008 | Ballagh et al. | |
| 7,529,655 B2* | 5/2009 | Gabele | G06F 17/5022 |
| | | | 703/16 |
| 7,624,383 B2* | 11/2009 | Barr | G06F 17/5009 |
| | | | 717/135 |
| 7,970,596 B2* | 6/2011 | Bade | G06F 17/5022 |
| | | | 703/13 |
| 8,352,229 B1* | 1/2013 | Ma | G06F 9/4552 |
| | | | 703/13 |
| 9,304,986 B1 | 4/2016 | Smith | |
| 2002/0100034 A1 | 7/2002 | Croix | |
| 2003/0033588 A1 | 2/2003 | Alexander | |
| 2003/0074177 A1 | 4/2003 | Bowen | |
| 2004/0199372 A1 | 10/2004 | Penn | |
| 2012/0203532 A1* | 8/2012 | Olsen | G06F 17/5022 |
| | | | 703/14 |
| 2013/0091098 A1* | 4/2013 | Hung | G06F 17/30091 |
| | | | 707/661 |
| 2014/0088946 A1* | 3/2014 | Schumpelt | G05B 17/02 |
| | | | 703/13 |

OTHER PUBLICATIONS

A.D. Pimentel et al., "A Systematic Approach to Exploring Embedded System Architectures at Multiple Abstraction Levels," IEEE Trans. on Computers, vol. 55, No. 2, Feb. 2006, pp. 99-112.*

C. Paiz et al., "A design framework for FPGA-based dynamically reconfigurable digital controllers," 2007 IEEE, pp. 3708-3711.*

A. Boukerche et al., "Dynamic Load Balancing Using Grid Services for HLA-Based Simulations on Large-Scale Distributed Systems," 2009 $13^{th}$ IEEE/ACM Int'l Symposium on Distributed Simulation and Real Time Applications, pp. 175-183.*

J Weinbub et al., "Towards a Free Open Source Process and Device Simulation Framework," 2012 15.sup.th Int'l Workshop on Computational Electronics (IWCE), IEEE, 4 pages.

K. Wong et al., "Distributive Interoperable Executive Library (DIEL) for Systems of Multiphysics Simulation," 2014 15.sup.th Int'l Conference on Parallel and Distributed Computing, Applications and Technologies, IEEE, Dec. 9-11, 2014, pp. 49-55.

"Cygon's Blog: Game Programming Adventures—Plugin Architecture," undated, 6 pages, [Online] [Retrieved in Jul. 3, 2015] Retrieved from the Internet<URL:http://blog.nuclex-games.com/tutorials/cxx/plugin-archite-cture/.

Vandevoorde, D., "Plugins in C++," undated, 10 pages, [Online] [Retrieved in Jul. 3, 2015] Retrieved from the Internet<URL:http://www.open-std.org/jtc1/sc22/wg21/docs/papers/2006/n- 2015.pdf.

"Design Patterns," Wikipedia, Last Modified Apr. 14, 2015, 11 pages, [Online] [Retrieved on Jul. 3, 2015] Retrieved from the Internet, URL:http://en.wikipedia.org/wiki/Design.sub.--Patterns.

* cited by examiner

DYNAMICALLY LOADED SYSTEM-LEVEL SIMULATION

CROSS REFERENCE TO RELATED APPLICATIONS

This application is a continuation of U.S. application Ser. No. 14/563,370 filed on Dec. 8, 2014, now U.S. Pat. No. 9,582,623, which claims the benefit of U.S. Provisional Patent Application No. 61/939,165 filed on Feb. 12, 2014, and U.S. Provisional Patent Application No. 62/082,880 filed on Nov. 21, 2014, the contents of which are incorporated by reference in their entirety.

BACKGROUND

SystemC is a system-level modeling language used for simulating the behavior of a system such as a system on a chip (SoC). SystemC allows a system to be described at different levels of abstraction. More specifically, SystemC is a language built in standard C++ by extending the C++ language with the use of class libraries. SystemC provides a system design and verification language that spans hardware and software. Example uses of SystemC include modeling partitioning of a simulation system, evaluating and verifying the assignment of blocks to hardware or software implementations, and measuring the interactions between and among simulated components.

Traditionally, a host compiler generates SystemC system simulations by statically linking together precompiled object files. Prior to execution of the simulation, the host compiler compiles simulation components into a simulation executable file. References by the simulation components to each other are bound to addresses internal to the simulation executable. Statically linked simulations are inconvenient for end users. When a component of the simulation is modified, the addresses associated with the bound references are no longer necessarily valid. Accordingly, the entire statically linked simulation is recompiled to relink references to the correct address, which results in significant time wasted for an end user managing simulations. Additionally, statically linked simulations expose the namespace of simulation components to other simulation components. As a result, different versions of a component cannot be simulated because these components use the same variable and function names. This limitation of static linking hampers simulation of systems with multiple subsystems.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1A:
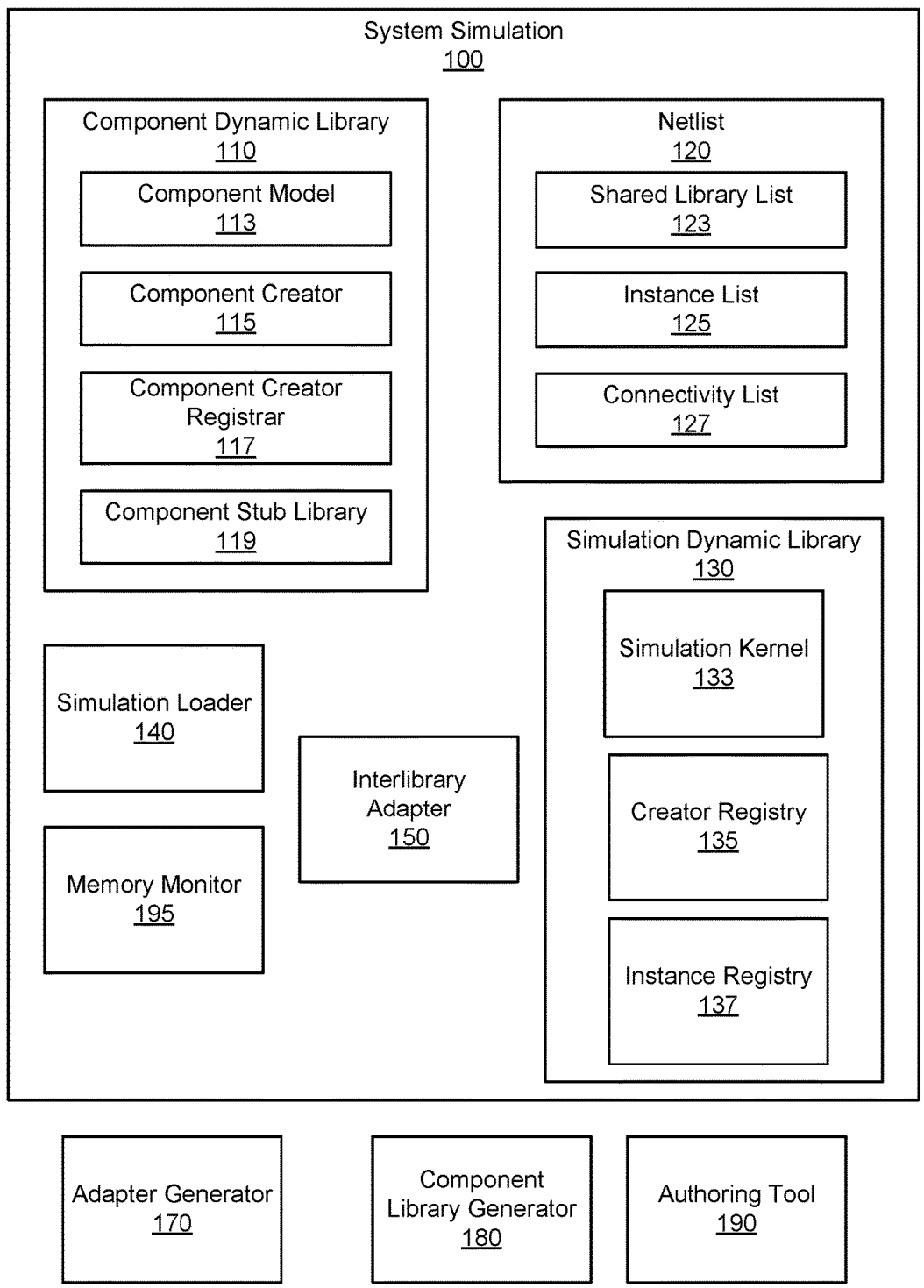
FIG. 1A is a block diagram illustrating an example environment for system simulation, according to an embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Configuration Overview

Embodiments of the present disclosure include a system simulation method, system, and non-transitory computer readable storage medium for dynamically loading components of a system simulation at runtime of the system simulation.

In one embodiment, netlist information is generated that includes component library information and component instance information. The component library information describes component dynamic libraries that include models of hardware components, and the component instance information describes instances of the hardware components. A simulation is generated at simulation run-time based on the netlist information. To do so, the component library information and the component instance information are accessed, and the component dynamic libraries are loaded based on the component library information. A simulation dynamic library providing simulation functionality referenced by the component dynamic libraries is loaded. One or more interlibrary adapters providing compatibility between the component dynamic libraries and a simulation library application binary interface (ABI) of the simulation dynamic library are also loaded. Instances of hardware components are instantiated based on the loaded component dynamic libraries and the component instance information, and the instantiated instances of the hardware components are connected to form the simulation. The simulation may then be performed during the simulation run-time responsive to the simulation being generated.

In one embodiment, the netlist information includes connectivity information describing connectivity between the instances of the hardware components. The instantiated instances of the hardware components are connected based on the connectivity information to form the simulation.

In one embodiment, the component dynamic libraries include component creators adapted to create instances of hardware components from the models of the hardware components. To load the component dynamic libraries, the component dynamic libraries are placed into memory and the component creators within the component dynamic libraries are registered into a creator registry. To instantiate the instances of the hardware components, one or more of the component creators from the creator registry are identified that correspond to the instances described by the component instance information. Using the identified component creators, the instances of the hardware components are instantiated.

In one embodiment, an interlibrary adapter includes a component library-facing ABI and a mapping between the component library-facing ABI and the simulation library ABI of the simulation dynamic library. A compiled component dynamic library includes a component stub library that redirects simulation dynamic library calls by the component dynamic library to the component library-facing ABIs of the interlibrary adapter. To generate a component dynamic library, one or more source files corresponding to a hardware component modeled by the component dynamic library are obtained. The component stub library is generated, and prior to simulation run-time, the source files are compiled into object files referencing the one or more interlibrary adapters through the component stub libraries. The object files and the component stub libraries are linked into the component dynamic libraries.

In one embodiment, a simulation described by the netlist may be performed with a different simulation dynamic library without recompiling the component dynamic libraries for compatibility with the simulation dynamic library, even if the different simulation dynamic library has a different simulation library ABI incompatible with the simulation library ABI of the previous simulation dynamic library. The one or more interlibrary adapters are recompiled based on one or more mappings determined between the one or more component library-facing ABIs and the different simulation library ABI.

The features and advantages described in the specification and in this summary are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

II. Simulation Environment

FIG. 1A is a block diagram illustrating an example environment for system simulation, in accordance with an embodiment. The environment includes a system simulation 100, an adapter generator 170, a component library generator 180, and an authoring tool 190. The system simulation 100 includes a component dynamic library 110, a netlist 120 (also referred to herein as "netlist information"), a simulation dynamic library 130, a simulation loader 140, an interlibrary adapter 150, and a memory monitor 195. In various alternative embodiments, the functionality described herein may be distributed among fewer or additional modules. Additionally, some of the modules and their associated functionality may be omitted.

The system simulation 100 models the operation of one or more hardware components (e.g. processor, memory, etc.) of a target system. The system simulation 100 may imitate the execution of computer program instructions (e.g., software, firmware) on the modeled hardware components (e.g., a model of a processor and/or memory), or the modeled hardware components may deliver specialized functionality (e.g., an application-specific integrated circuit). In one embodiment, the system simulation 100 is implemented using a system-level description language (e.g., SystemC, SpecC, SystemVerilog). A hardware component is a physical entity that manipulates physical signals representing information through technologies such as digital and/or analog electronics.

The system simulation 100 may represent modeled hardware components hierarchically. For example, a system simulation 100 of a computer includes a model of a processor, a memory, and an input interface (e.g., a Universal Serial Bus (USB) port). The model of the processor includes sub-models of a cache, a register, calculation electronics (e.g., an arithmetic logic unit (ALU), a floating-point unit (FPU)), and signal routing electronics (e.g., a bus, a multiplexer)).

II.A. Component Dynamic Library

The component dynamic library 110 contains instructions for creating and simulating a hardware component. The component dynamic library 110 includes a component model 113, a component creator 115, a component creator registrar 117, and a component stub library 119.

The system simulation 100 may include one or more instances of a hardware component. To determine how a particular instance of a hardware component functions (e.g., in response to an input or an event), the system simulation 100 uses a component model 113, which are instructions describing the hardware component's functionality. In one embodiment, a component model 113 includes variables, which represent the state of a simulated hardware component, parameters, which describe properties of simulated hardware that are invariant during a simulation, and functions, which modify or retrieve the state of the simulated hardware component. Different component dynamic libraries 110 may have different component models 113 corresponding to the same hardware component. For example, different component dynamic libraries 110 each have different component models 113 describing a hardware component at the transistor level, the digital circuit-level, or at a behavioral level, respectively. Different component libraries 110 with different component models 113 provide varying levels of detail, accuracy, and speed for simulating a hardware component.

The component creator 115 instantiates an instance of a hardware component described by the component model 113. In one embodiment, the component creator 115 of a hardware component initializes parameters and variables representing the state of an instantiated component based on default values or configuration information associated with an instance. In initializing parameters and variables, the component creator 115 may allocate memory in a simulating computer for the instance of the hardware component. For example, a multiplexer has parameters describing the multiplexer's number of bits in inputs and outputs, the multiplexer's number of inputs, and the multiplexer's number of outputs. When the component creator 115 instantiates the multiplexer, the component creator 115 determines the number of bits, the number of inputs, and the number of outputs based at least in part on configuration information supplied to the component creator 115 or default parameters.

The component creator registrar 117 includes instructions used to load a component dynamic library 110 into a simulation. The component creator registrar 117 includes instructions to register a component creator 115 of a simulation in a creator registry 135, which is part of the simulation dynamic library 130. In one embodiment, the component creator registrar 117 creates an entry in the creator registry 135, which contains an identifier of the component dynamic library 110 and a pointer to the component creator 115 in the component dynamic library 110. The identifier uniquely identifies the component dynamic library 110. For example, the identifier is a string indicating the component dynamic library's "vendor library name version," (VLNV) which indicates the class name and version number of the component dynamic library 110.

The component stub library 119 provides an interface between the component dynamic library 110 and the interlibrary adapter 150. The component stub library 119 is described further in conjunction with the interlibrary adapter 150.

II.B. Netlist

The netlist 120 provides information indicating configuration of hardware components present in a simulation. The netlist 120 includes a shared library list 123, an instance list 125, and a connectivity list 127.

The shared library list 123 includes component library information, which details the component dynamic libraries 110 used to model the hardware components of a simulation. In one embodiment, the shared library list 123 includes a class name for a component dynamic library 110 and reference (e.g., a memory pointer) to the component dynamic library 110. In some embodiments, the class name for a component dynamic library 110 is a version-specific class name (e.g., a VLNV), which enables use of multiple versions of a component dynamic library 110 in the same simulation. The shared library list 123 may include this information for several component dynamic libraries 110.

The instance list 125 includes instance information, which enumerates component instances of the simulated target system. An instance of a component is a single, distinct realization of a hardware component. The instance list 125 may include multiple instances of the same type of hardware component (e.g. multiple instances of a processor core), all modeled by the same component dynamic library 110. An entry in the instance list 125 may provide an instance identifier to refer to each instance as well as indicate the component dynamic library 110 that models the instance. An entry in the instance list 125 may also include parameters (e.g., the data capacity of a memory hardware component or the number of inputs to a multiplexer) to configure an instance.

The connectivity list 127 includes connectivity information describing connections among the instances of hardware components enumerated by the instance list 125. In one embodiment, an entry in the connectivity list 127 describes the one or more instances connected by a connection, and particular ports or interfaces of the instances bound to the connection. An entry in the connectivity list 127 may also include the type of the connection (e.g., buffer, mutex, wire, semaphore) and parameters of the connection (e.g., data type, number of bits).

II.C. Simulation Dynamic Library

The simulation dynamic library 130 provides an infrastructure for executing the system simulation 100. The simulation dynamic library 130 includes a simulation kernel 133, a creator registry 135, and an instance registry 137.

The simulation kernel 133 includes instructions that serve as infrastructure for executing the system simulation 100. The simulation kernel 133 may provide a framework for advancing the simulation through time or events. For an example event-based simulation, the simulation kernel 133 determines an order for processing simulation events and provides resources to resolve simulation events. The simulation kernel 133 may also provide functionality used by other components of the system simulation 100, such as by the component dynamic libraries 110. For example, the simulation kernel 133 includes functions called by a component dynamic library 110 to detect errors or to notify a user of an error or unusual operating condition.

The creator registry 135 is a list of loaded component dynamic libraries 110 that is created at run-time. In one embodiment, the component creator registrar 117 creates an entry in the creator registry 135 for a loaded component dynamic library 110. The entry in the creator registry 135 contains an identifier of the component dynamic library 110 and a pointer to the component creator 115 in the component dynamic library 110. In one embodiment, a component dynamic library 110 may depend on additional embedded files. Such dependency information is embodied in metadata information recorded by the authoring tool 190. The creator registry 135 may contain pointers to the embedded files.

The instance registry 137 is a list of instantiated components that is created at run-time. In one embodiment, the component creator 115 of an instantiated component (or the simulation loader 140) creates an entry in the instance registry 137 for the instantiated component. The entry in the instance registry 137 contains an identifier of the instance and a pointer to a memory location allocated to the instantiated instance.

II.D. Simulation Loader

The simulation loader 140 takes as an input the netlist 120 and one or more component dynamic libraries 110, generates the simulation at run-time, and outputs a generated simulation. In one embodiment, the simulation loader 140 is an executable file used to perform a simulation. When a user instructs a computer to perform a simulation, the simulation loader 140 loads the system simulation 100 into the memory of the computer at simulation run-time. Loading a simulation system "at simulation run-time" denotes that the simulation loader 140 generates the simulation immediately after a command to execute a simulation (e.g., a user input, a scheduled simulation) and immediately before performing the simulation. To generate a simulation by dynamic loading at simulation run-time, the simulation loader 140 loads relevant component dynamic libraries 110, instantiates hardware components of the simulation, and connects the instances of the hardware components.

By generating the system simulation 100 at simulation run-time, the simulation loader 140 avoids building a statically linked simulation file, which incurs significant overhead. Dynamically loading a simulation also avoids pitfalls of a dynamically linked simulation. In a dynamically linked simulation, the namespaces of various dynamic libraries (e.g., the component dynamic library 110, the simulation dynamic library 130) are exposed to each other. If different dynamic libraries use the same name to refer to distinct functions, variables, or objects, then the dynamic libraries are no longer compatible. Dynamically generating and loading the system simulation 100 at run-time also avoids implementation difficulties of dynamically linking libraries. If libraries are initially written for use in a statically linked simulation, they are not necessarily compatible with a dynamically linked simulation due to unresolvable run-time ambiguities in references to functions, variables, or objects. Remediating a library for compatibility with a dynamically linked simulation is a labor intensive process and is often not be feasible without completely re-writing the library's source code. Thus, the simulation loader 140 generates dynamically loaded simulations at simulation run-time to avoid significant modification of libraries written for use in statically linked simulations.

By dynamically loading a simulation at run-time, a system simulation 100 may be easily modified. If portions of the simulation are modified after generating the simulation, then the simulation loader 140 re-loads those portion affected by the modification. For example, if the netlist 120 is modified, then the simulation loader 140 loads any newly added or modified instances as well as modified connectivity between instances. As another example, a component dynamic library 110 modeling a hardware component is swapped for a different version modeling the same hardware component (e.g., a slow hardware-level version is replaced by a fast software-level version). In this example, the simulation loader 140 may modify the reference to the component dynamic library 110 associated with the affected instances without re-linking the entire system simulation 100.

II.E. Interlibrary Compatibility

The component stub library 119 provides an interface between the component dynamic library 110 and the interlibrary adapter 150. The interlibrary adapter 150 provides an interface between the component dynamic library 110 and the simulation dynamic library 130. The interlibrary adapter 150 includes a component library-facing interface on which the component stub library 119 depends, and the simulation dynamic library 130 includes a simulation library interface on which the interlibrary adapter 150 depends.

A component library name is a symbol (e.g., a string in source code, an address in memory) used to refer to a program construct in the component dynamic library 110. A program construct is a basic element, command, or statement used in source code. Example program constructs include functions, variables, operators, objects, and classes. A simulation library name is a symbol (e.g., a string in source code, an address in memory) used to refer to a program construct in the simulation dynamic library 130. In one embodiment, the component dynamic library 110 may rely on a simulation library program construct (e.g., a function) defined in the simulation dynamic library 130. The component library name of the simulation library program construct may differ, however, from the simulation library name of the simulation library program construct.

For example, if a simulation dynamic library 130 is modified and if the component dynamic library 110 is not modified, then the component library name of a function called by a component dynamic library 110 may be different from the function's actual simulation library name defined in the simulation dynamic library 130. Even if the source code name of a simulation library program construct does not change between versions of a simulation dynamic library 130, the machine-code used to refer to the program construct in the simulation dynamic library's application binary interface (ABI) may change. To ensure compatibility between the component dynamic library 110 and the simulation dynamic library 130, the system simulation 100 uses the component stub library 119 and the interlibrary adapter 150 to bridge gaps in compatibility between the simulation dynamic library 130 and the component dynamic library 110.

The component stub library 119 takes as input a component library function name used by the component dynamic library 110, maps the component library function name to a corresponding intermediate adapter name, and outputs the intermediate adapter name. An intermediate adapter name is a symbol (e.g. a string in source code, an address in memory) used by the interlibrary adapter 150 to refer to a program construct. At a machine code level, the component stub library 119 depends on a simulation library-facing ABI of the interlibrary adapter 150.

The interlibrary adapter 150 takes as input the intermediate adapter name, maps the intermediate adapter name to the corresponding simulation library name, and outputs the simulation library name. Hence, the component dynamic library 110 may use the interlibrary adapter 150 to call simulation library program constructs from the simulation dynamic library 130 without exposure to the namespace of the simulation dynamic library 130. The interlibrary adapter 150 provides for compatibility between a simulation library-facing ABI of the interlibrary adapter 150 and a simulation library ABI of the simulation dynamic library 130.

The adapter generator 170 takes as input the component dynamic library 110 and the simulation dynamic library 130, identifies dependencies by the component dynamic library 110 on the simulation dynamic library 130, and outputs an interlibrary adapter 150 to interface between the component dynamic library 110 and the simulation dynamic library 130. The adapter generator 170 identifies a component-library facing interface corresponding to a version of the simulation dynamic library 130 compatible with the component dynamic library 110 (or its source files). The adapter generator 170 identifies the simulation library interface of the present version of the simulation dynamic library 130. The adapter generator 170 determines a mapping between programming constructs of the component library-facing interface and the simulation library interface. Using the mapping, the adapter generator 170 generates the interlibrary adapter 150, which includes functions to translate calls to the component-library facing interface into calls to the simulation library interface.

For example, the interlibrary adapter 150 is generated in conjunction with the component stub library 119 as part of compiling a component dynamic library 110. Even if the source files of the component dynamic library 110 were written for compatibility with a first version of the simulation dynamic library 110, the interlibrary adapter 150 may provide for compatibility with a second version of the simulation dynamic library 110.

As another example, a first version of the simulation dynamic library 130 is replaced by a second version of the simulation dynamic library 130 after compiling the component dynamic library 110. The second version of the simulation dynamic library 130 has a simulation library interface different than that of the first version of the simulation dynamic library 130. The adapter generator 170 generates an updated interlibrary adapter 150 (or re-generates the interlibrary adapter 150) to maintain compatibility between the component dynamic library 110 and the second version of the simulation dynamic library 130. The updated interlibrary adapter 150 maintains the same component library-facing interface as the initial interlibrary adapter 150 to maintain compatibility with the component stub library 119 of the component dynamic library 110, beneficially obviating compilation of the component dynamic library 110.

In one embodiment, the adapter generator 170 identifies references to program constructs of the simulation dynamic library 130 ("simulation library program constructs") in the source files of the component dynamic library 110. The adapter generator 170 identifies portions of the component library-facing ABI (a machine code-level component library-facing interface) that correspond to the identified simulation library program constructs. The adapter generator 170 identifies portions of the simulation library ABI (a machine code-level simulation library interface). The adapter generator 170 then determines a mapping between the component library-facing ABI and the simulation library ABI to provide compatibility. For example, the mapping for a function includes pointers to the memory locations of input and output variables, or includes instructions to convert variables between data types (e.g., between floating-point format and double-precision floating-point format).

II.F. Component Library Generation

The component library generator 180 takes as input the simulation dynamic library 130 and source files describing component models 113, compiles and links the source files to generate a component dynamic library 110, and outputs the component dynamic library 110. The source files contain source code describing component models 113 (e.g., of hardware components) as well as source code used to interact with other objects in the system simulation 100 (e.g., source code representing the component creator registrar 117).

In one embodiment, the component library generator 180 generates an object file corresponding to each source file. The object file contains machine code representing a hardware component and is compatible with the simulation library interface of the simulation dynamic library 130 through the interlibrary adapter 150.

In some embodiments, the component library generator 180 generates the component stub library 119 in conjunction with the adapter generator 170 generating the interlibrary adapter 150. In other embodiments, the component stub library 119 is generated after the interlibrary adapter 150. The component library generator 180 identifies the component library-facing interface of the interlibrary adapter 150 and generates stub references to the component library-facing interface. The component stub library 119 comprises the stub references. The component library generator 180 binds references to simulation library program constructs to the stub references. Thus, where the source file refers to a simulation library program construct, the object file refers to a corresponding stub reference in the component stub library 119 instead. The component stub library 119 ensures that the resulting component dynamic library 110 depends on the simulation dynamic library 130 indirectly through the interlibrary adapter 150 because references to the simulation dynamic library 130 are routed through the interlibrary adapter 150 by the component stub library 119

The component library generator 180 links the object files together to form a component dynamic library 110 having a common namespace. If a component dynamic library 110 includes any dependencies on other embedded files, the component library generator 180 may embed metadata describing the dependency in the dynamic component library 110. In one embodiment, the component library generator 180 generates component creator registrars 117 for the component dynamic libraries 110 of the shared library list 123.

II.G. Netlist Generation

The authoring tool 190 receives user inputs for creating a design of the target system and converts the design into the netlist 120. The authoring tool 190 may be one or more computer-aided design programs that receive user input through a graphical user interface, command line prompt, or a combination thereof. For example, a user may select hardware components, configure properties of the hardware components, and connect ports of the hardware components through the authoring tool 190 to create a target system design. The authoring tool 190 translates the components into the instance list 125 and translates the connections between the components into the connectivity list 127. The authoring tool 190 also determines component dynamic libraries 110 associated with the components and collects these component dynamic libraries 110 into the shared library list 123.

II.H. Memory Monitoring

The memory monitor 195 takes as input memory resources available to a computer running the system simulation 100, determines whether to load or unload one or more portions of a component dynamic library 110, and then instructs the operating system of the computer running the simulation to load or unload the corresponding portions of the component dynamic library 110. For example, the portion of the component dynamic library 110 is a component model 113 or a portion of a component model 113. In one embodiment, portions that may be unloaded include portions that do support communication between instances of hardware components (e.g., ports, port interfaces) or portions that do not directly interact with simulation processes. For example, in a system-level modeling language such as SystemC, initialization routines may be unloaded. As another example in SystemC, support routines for port interfaces may be unloaded, but portions implementing hardware component ports may not be unloaded unless they are unbound to instances of hardware components.

In one embodiment, the memory monitor 195 determines whether all of the component dynamic libraries 110 listed in the shared library list 123 may be loaded into memory of the computer running the simulation. If there is sufficient memory, then the memory monitor 195 allows loading of all of the component dynamic libraries 110. If there is not sufficient memory, then the memory monitor 195 selects a subset of the component dynamic libraries 110 (or portions thereof) to dynamically load or unload from the memory of the computer conducting the simulation. Unloading a portion of a simulation component refers to allowing memory allocated to a portion of an unloaded component dynamic library 110 to be allocated to other data.

In one embodiment, the memory monitor 195 identifies one or more portions of component dynamic libraries 110 (or embedded files referenced by component dynamic libraries 110) that the simulation will not use (or is unlikely to use) within a threshold time period into the future. For example, the memory monitor 195 identifies such a portion of a component dynamic library 110 responsive to a portion of a component model 113 not being used within a threshold period of time, or based on a ranking of portions of a component dynamic library 110 by last time used. For example, a portion of a component model 113 is identified as not being used where the portion implements a port that is unbounded to any instances of hardware components. The memory monitor 195 instructs the operating system to unload one or more portions of a component dynamic library 110 that the system simulation 100 will not use (or will likely not use). As another example, the memory monitor 195 identifies a portion of a component dynamic library 110 or another file (e.g., a configuration file) that is loaded as part of generating a simulation but not used to perform the simulation. In the example, the memory monitor 195 unloads the identified portion of the component dynamic library 110 or other file not used after generating the simulation. Unloading portions of dynamic libraries beneficially reduces memory use by the system-level simulation and increases memory available to hold other data.

Additionally, the memory monitor 195 may identify an unloaded portion of a component dynamic library 110 that is anticipated to be used by the system simulation 100. For example, the memory monitor 195 identifies such a portion using heuristics (e.g., a recently used portion of a component dynamic library 110, a portion of a component library 110 related to another portion of the component dynamic library 110 used to resolve a recent simulation event). The memory monitor 195 instructs the operating system to load into memory the identified portion of the component dynamic library 110 that the system simulation 100 is anticipated to use and instructs the operating system to unload from memory one or more portions of one or more component dynamic libraries 110 that the system simulation 100 is not anticipated to use. Pre-loading portions of dynamic libraries beneficially reduces simulation time by preventing (or decreasing the frequency) of the simulation halting to wait for a dynamic library to load.

III. Interlibrary Dependency

Figure 1B:
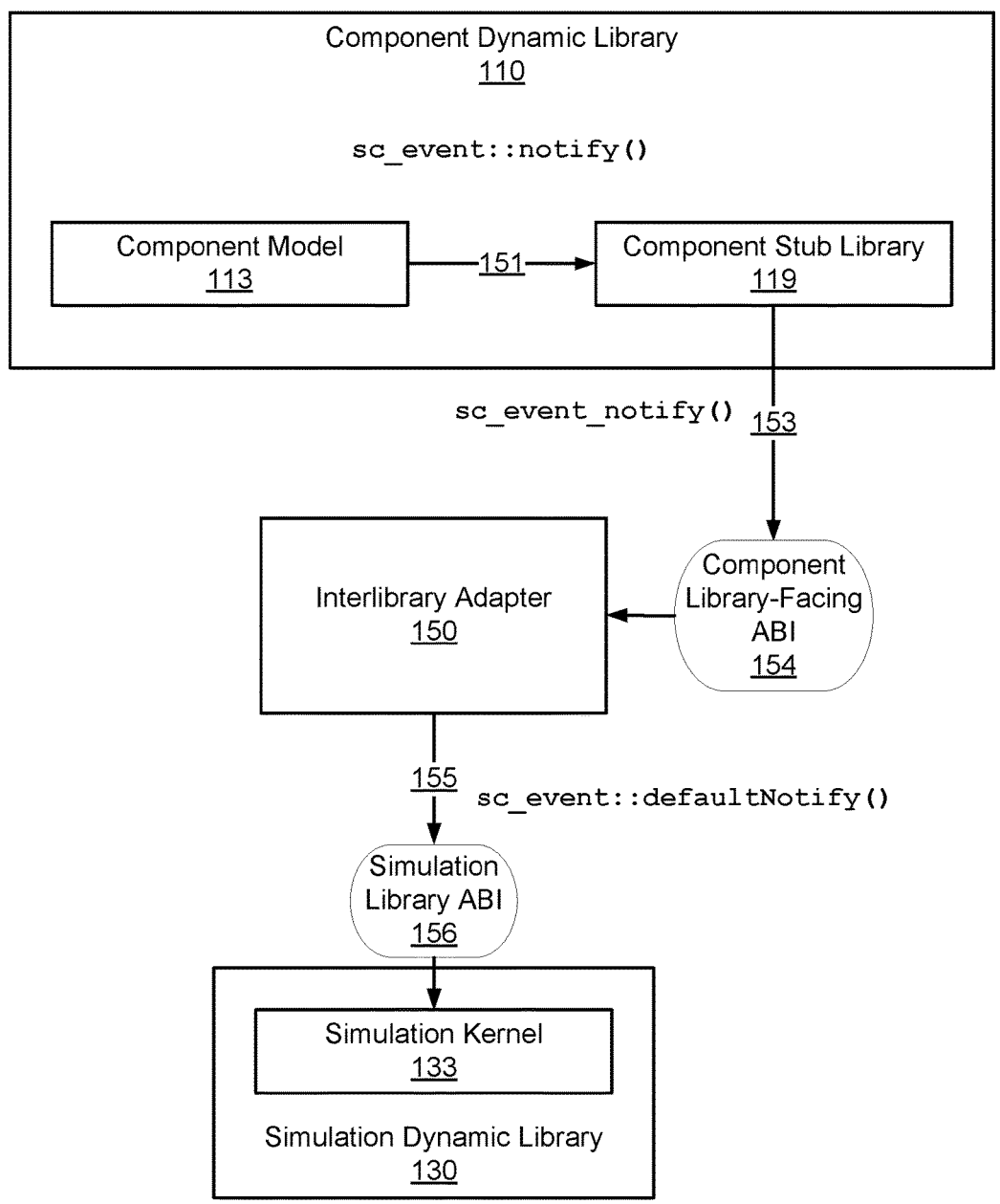
FIG. 1B is conceptual diagram illustrating interlibrary dependency in the system simulation, according to an embodiment.

FIG. 1B is conceptual diagram illustrating interlibrary dependency in the system simulation 100, according to an embodiment. The dynamic library generator 180 identifies simulation library program constructs in the component dynamic library 110 that depend on program constructs in the simulation dynamic library 130. During simulation run-time, simulation library program constructs perform simulation dynamic library calls to access the simulation library program constructs via the interlibrary adapter 150. When linking the component dynamic library 110, the dynamic library generator 180 links these identified program constructs to intermediate adapter names rather than directly to the simulation library names. In the illustrated example, a function in the component model 113 depends on the simulation kernel 133. Accordingly, to call the function, the component model 113 calls 151 the component stub library 119, which translates the function's simulation library name to an intermediate adapter name. Using the intermediate adapter name, the component stub library 119 calls 153 the interlibrary adapter 150, which translates the intermediate adapter name into a simulation library name.

When compiled (and accordingly translated to machine code) and linked, the component stub library 119 accesses 153 the interlibrary adapter 150 through a component library-facing ABI 154. On the source code level, the interlibrary adapter 150 then calls 155 the function in the simulation kernel 133 using the simulation library name. When compiled and linked, the interlibrary adapter 150 accesses 155 the simulation kernel 133 using a simulation library ABI 156 of the simulation dynamic library 130. The component stub library 119 accesses the interlibrary adapter 150 through the component library-facing ABI 154. Because the component stub library 119 references the component library-facing ABI 154, changes to the component library-facing ABI 154 necessitate recompilation of the component dynamic library 110. In contrast, the simulation library ABI 156 is referenced by the interlibrary adapter 150, so changes in the simulation library ABI 156 may be mitigated by recompiling the interlibrary adapter 150 without recompiling dependent component dynamic libraries 110.

In one embodiment, the component dynamic library 110 and the simulation dynamic library 130 use a domain-specific language built on a low-level programming language. The component dynamic library 110 and the simulation dynamic library 130 express the component library names and the simulation library names, respectively, in the high-level programming language. The component dynamic library 110 and the simulation dynamic library 130 maintain separate namespaces within the domain-specific language. The interlibrary adapter 150 expresses interlibrary adapter names in the low-level programming language. Accordingly, the component stub library 119 translates the component library name in the high-level programming language to the intermediate adapter name in the low-level programming language. The interlibrary adapter 150 translates the intermediate adapter name in the low-level programming language to the simulation library name in the domain-specific language in the namespace of the simulation dynamic library 130. Thus, the component dynamic library 110 may access program constructs in the namespace of the simulation dynamic library 130 by using the low-level programming language. The interlibrary adapter 150 has a very simple programmatic structure; accordingly, the component library-facing ABI 154 is relatively stable in contrast to the simulation library ABI 156, which may vary if the simulation dynamic library 130 is updated in significant manner. For example, if an update to the simulation dynamic library 130 modifies the number or data format of a function's inputs or outputs, then the ABI 156 may change.

For example, one function of the simulation dynamic library 130 is "sc_event::notify( )" in the C++ programming language, which is a domain-specific language built on the low-level programming language C. To resolve this function, the component dynamic library 110 uses the component stub library 119 to translate the component library name (in the domain-specific language C++) to the intermediate adapter name "sc_event_notify( )" in the low-level C programming language. The interlibrary adapter 150 implements the "sc_event_notify( )" function by mapping the intermediate adapter name to "sc_event::defaultNotify( )" which is the corresponding simulation library name in the domain-specific language C++, in the separate namespace of the simulation dynamic library 130. In the foregoing example, an application programming interface (API) corresponding to the component library-facing ABI 154 is expressed in the C programming language, and an API corresponding to the simulation library ABI 156 is expressed in the C++ programming language.

In some embodiments, the interlibrary adapter 150 includes a mapping between component library names and simulation library names at a source code level, which provides compatibility with an API of the simulation dynamic library 130. For example, when a function's simulation library name changes in an updated version of the simulation dynamic library 130, an older version of the component dynamic library 110 refers to the function using an outdated component library name. To maintain compatibility, the interlibrary adapter 150 uses the mapping to determine the function's updated simulation library name. The interlibrary adapter 150 uses the mapping at the API level to determine a mapping to the simulation dynamic library's simulation library ABI 156.

IV. Simulation Overview

Figure 2:
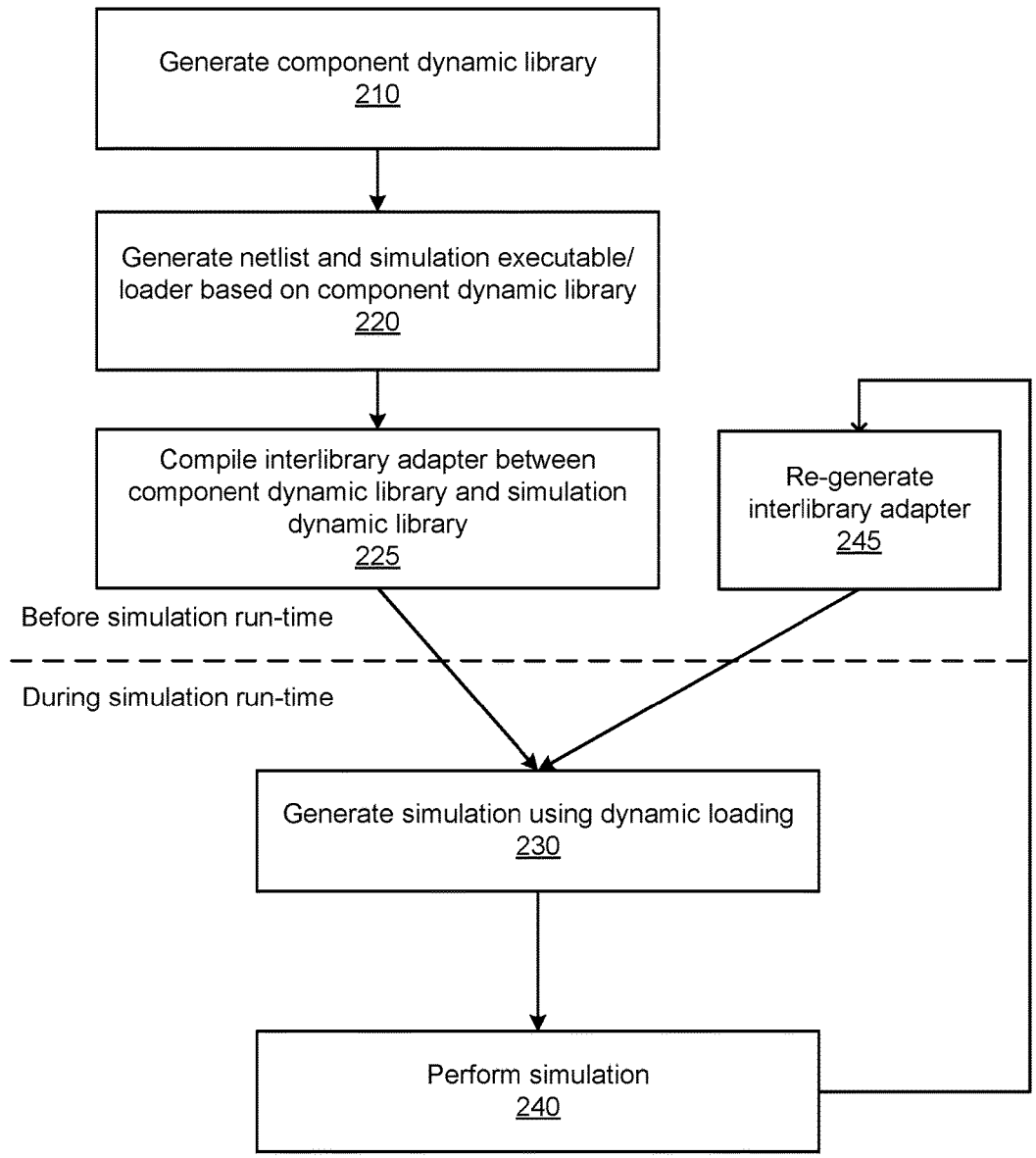
FIG. 2 is a flowchart illustrating an overview of an example process for creating, loading, and performing a system simulation, according to an embodiment.

FIG. 2 is a flowchart illustrating an overview of an example process for creating, loading, and performing a system simulation 100, according to an embodiment. The steps of the process described in conjunction with FIG. 2 may be performed in different orders than the order described in conjunction with FIG. 2. For example, steps occurring before simulation run-time may occur simultaneously or in sequence. In some embodiments, different and/or additional steps than those described in conjunction with FIG. 2 may be performed.

Prior to simulation run-time, the component library generator 180 generates 210 one or more component dynamic libraries 110. Generating 210 a component dynamic library 110 is described further in conjunction with FIG. 3A.

Also prior to simulation run-time, the authoring tool 190 generates 220 netlist information 120. The netlist information 120 includes component instance information (e.g., the instance list 125) and component library information (e.g., the shared library list 123). The component instance information describes instances of the hardware component to be simulated. The component library information describes which component dynamic libraries 110 correspond to the instances described in the instance information and hence which models of the hardware components are used in the system simulation 100. The component library information may include version-specific library names (e.g., vendor library name version (VLNV)). The netlist information 120 may also include connectivity information (e.g., the connectivity list 127) describing connectivity between the instances of the hardware components.

Also prior to simulation run time, the adapter generator 170 compiles 225 one or more interlibrary adapters 150 based on determined mappings between the component library-facing ABI 154 corresponding to the component dynamic library 110 and the simulation library ABI 156 of the simulation dynamic library 130. For example, the adapter generator 170 may generate a mapping based on changes from a current API of the simulation dynamic library 130 and a previous API of the simulation dynamic library 130 when the component dynamic library 110 was compiled. The component stub library 119 reflects the previous API of the simulation dynamic library 130. Based on the changes between the current and previous APIs, the adapter generator 170 determines a mapping between the component library-facing ABI 154 (which corresponds to the previous API of the simulation dynamic library 130) and the simulation library ABI 156 (which corresponds to the current API of the simulation dynamic library 130). Accordingly, the interlibrary adapter 150 emulates a version of the simulation dynamic library 130 on which the component dynamic library 110 depends even though a different version of the simulation dynamic library 130 may be present. In some instances, the interlibrary adapter is compiled 225 in conjunction one or more corresponding component dynamic libraries 110.

At simulation run-time, the simulation loader 140 generates 230 the simulation using dynamic loading based on the netlist information 120 and the component dynamic libraries 110. For example, the simulation loader 140 coordinates loading of the component dynamic libraries 110 and simulation dynamic library 130 into memory of a computer. Continuing the example, the simulation loader 140 may allocate memory of the computer for the instances of the simulated hardware components and the connection between the instances. Generating 230 the simulation is described further in conjunction with FIG. 4.

During simulation run-time, the system simulation 100 is performed responsive to the simulation loader 140 generating the system simulation 100. In one embodiment, a computer that includes the dynamically loaded system simulation 100 determines, by a processor, results of the system simulation 100 in response to one or more inputs. For example, the system simulation 100 represents a target system having two multicore processors executing computer program code stored on a simulated memory. The computer performing the system simulation 100 determines how efficiently the multicore processors execute instructions in parallel threads of the computer program code stored in the simulated memory. In one embodiment, the computer performing the simulation selects dynamic libraries to unload from memory. For example, the computer identifies a dynamic library used to generate the simulation at run-time (e.g., a dynamic library functionality used for configuration but not for performing the simulation). Responsive to determining that the identified dynamic library will not be used to perform the simulation, the computer unloads the identified dynamic library to increase memory available to the computer running the simulation.

After the simulation is performed 240 but prior to run-time of another simulation, the adapter generator 170 may re-generate 245 the interlibrary adapter 150. The interlibrary adapter 150 may be re-generated 245 in response to a different version of the simulation dynamic library 130 being used. Re-generating 245 the interlibrary adapter 150 is described further in conjunction with FIG. 3B.

V. Dynamic Library Generation

Figure 3A:
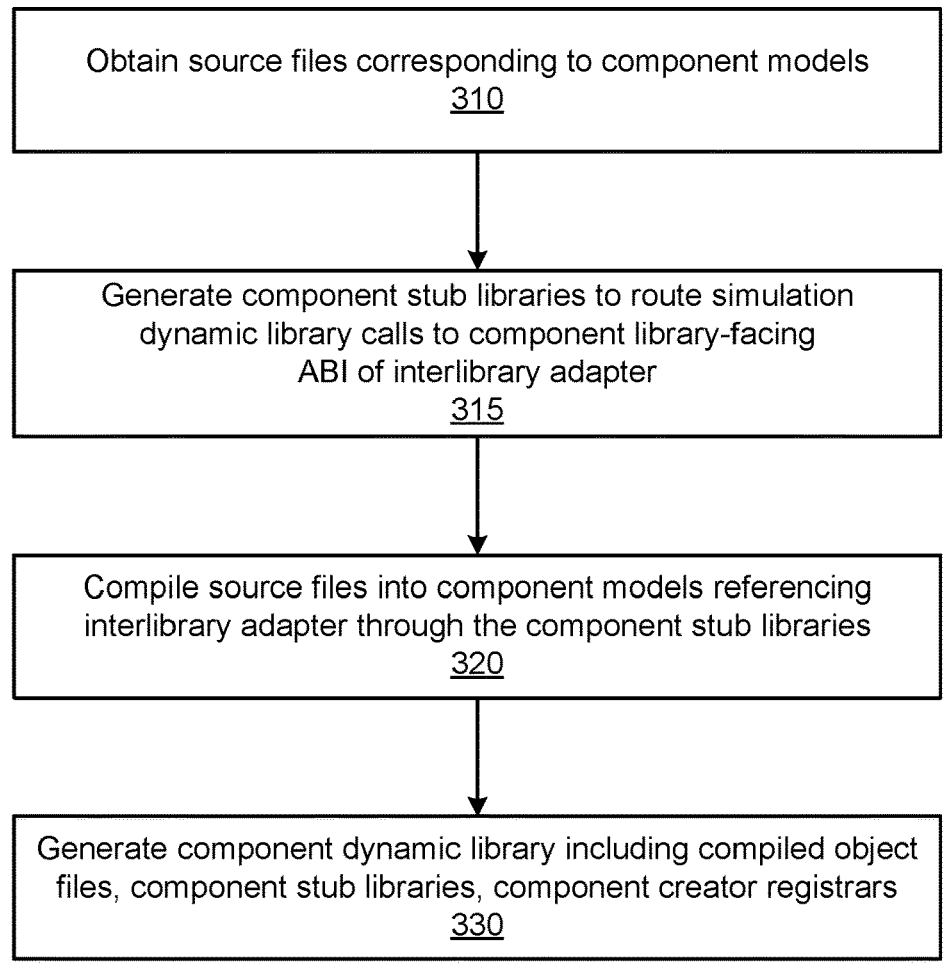
FIG. 3A is a flowchart illustrating an example process for generating a component dynamic library, according to an embodiment.

FIG. 3A is a flowchart illustrating an example process for generating a component dynamic library 110, according to an embodiment. The steps of the process described in conjunction with FIG. 3A may be performed in different orders than the order described in conjunction with FIG. 3A. For example, some steps described as occurring sequentially may occur simultaneously. In some embodiments, different and/or additional steps than those described in conjunction with FIG. 3A may be performed.

The component library generator 180 obtains 310 source files corresponding to hardware components modeled by a component dynamic library 110. The component library generator 180 may also generate 315 a component stub library 119, which routes simulation dynamic library calls by the component dynamic library 110 to the interlibrary adapter 150. In one embodiment, the component stub library 119 includes a mapping between component library names and interlibrary adapter names, where the simulation library names refer to simulation library program constructs used by the source file. The component library names refer to component library names of simulation library program constructs used by the source file (and hence by the component dynamic library 110). The component stub library 119 references a component library-facing ABI 154 of the interlibrary adapter 150. Accordingly, simulation dynamic library calls in the compiled component dynamic library 110 reference the interlibrary adapter 150 rather than the simulation dynamic library 130. Generating 315 the component stub library 119 may also include generating an interlibrary adapter 150, as described with respect to FIGS. 1A and 2.

Prior to generating the simulation at simulation run-time, the component library generator 180 compiles 320 the source files into component models 113 referencing the interlibrary adapter 150 through the component stub libraries 119, which ensures the compatibility of the component models 113 with an application binary interface of the simulation dynamic library 130. In one embodiment, the component models 113 are compiled object files representing a model of a hardware component in machine code. The component library generator 180 generates the component models 113 based on the obtained component stub library 119. For example, the component library generator 180 compiles the component models 113 so that references to simulation library program constructs are resolved by the component stub library 119, which in turn resolves the reference using the interlibrary adapter 150.

Also prior to generating the simulation at simulation run time, the component library generator 180 generates 330 the component dynamic library 110 by linking the compiled component models 113 into a component dynamic library 110. The generated component dynamic library 110 includes the linked and compiled component models 113, the component creator registrar 117, and the component stub library 119.

VI. Interlibrary Adapter Re-Generation

Figure 3B:
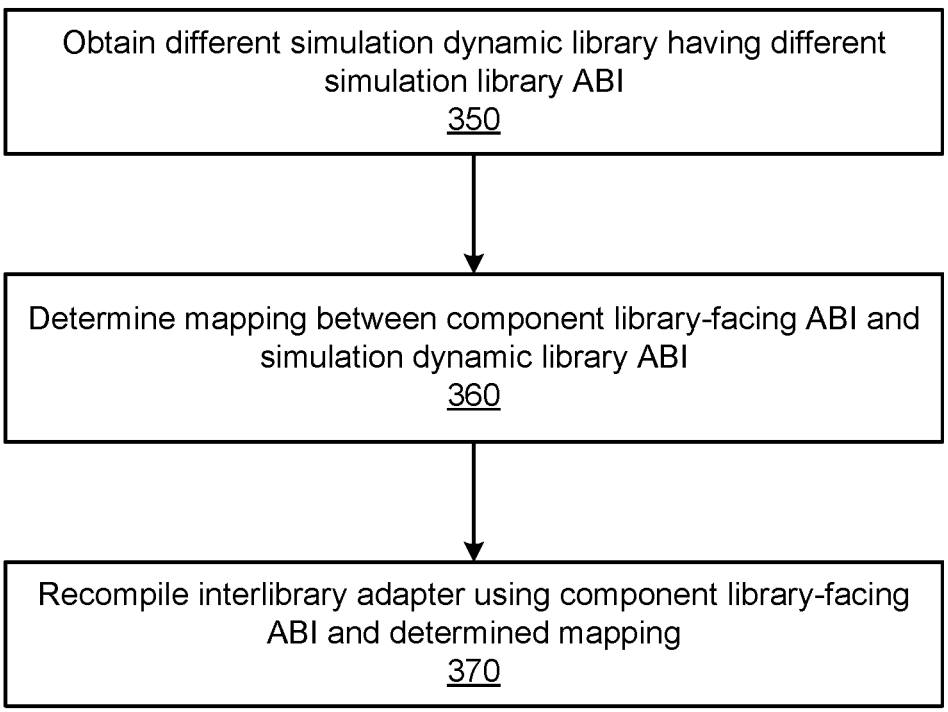
FIG. 3B is a flowchart illustrating an example process for re-generating an interlibrary adapter, according to an embodiment.

FIG. 3B is a flowchart illustrating an example process for re-generating an interlibrary adapter 150, according to an embodiment. The steps of the process described in conjunction with FIG. 3B may be performed in different orders than the order described in conjunction with FIG. 3B. For example, steps occurring before simulation run-time may occur simultaneously or in sequence. In some embodiments, different and/or additional steps than those described in conjunction with FIG. 3B may be performed.

A first interlibrary adapter 150 providing compatibility between component dynamic libraries 110 and a first version of a simulation dynamic library 130 is obtained. For example, the interlibrary adapter 150 is compiled for use in a first simulation involving the first simulation dynamic library 130. Subsequently, a second version of the simulation dynamic library 130 is obtained 350 that has a second, different simulation library ABI 156 than the first simulation ABI of the first simulation dynamic library 130. Accordingly, the component dynamic libraries 110 that depend on the simulation dynamic library 130 through the first interlibrary adapter 150 are no longer compatible with the second version of the simulation dynamic library 130. For example, the first version of the simulation dynamic library 130 is designed to perform simulations quickly (i.e., with fewer processing operations) with a decrease in simulation accuracy, and the second version of the simulation dynamic library 130 is designed to perform simulation more accurately with an increase in simulation duration (i.e., an increase in processing operations relative to the first version of the simulation dynamic library 130).

The adapter generator 170 determines 360 a mapping between a component library-facing ABI 154 of the interlibrary adapter 150 and the second simulation library ABI 156. For example, the mapping provides how to transform the calling convention used by the component library-facing ABI 154 to the calling convention used by the simulation library ABI 156. For example, the calling convention indicates the order of input variables or identifies registers or memory locations storing input variables passed to the simulation library programming construct through a simulation library function call. The determined mapping maintains the same component library-facing ABI 154 of the initial interlibrary adapter 150 as modifying the component library-facing ABI 154 would render the component dynamic library 110 incompatible with the interlibrary adapter 150 because the component stub library 119 depends on the component library-facing ABI 154 of the interlibrary adapter 150.

The adapter generator 170 recompiles 370 the interlibrary adapter 150 (or generates a second version of the interlibrary adapter 150) based on the determined mapping between the component library-facing ABI 154 of the interlibrary adapter 150 and the second simulation library ABI 156. Accordingly, the interlibrary adapter 150 provides compatibility between the component dynamic library 110 and the second version of the simulation dynamic library 130 without recompiling the component dynamic library 110, beneficially reducing waiting time for a user configuring a simulation. The interlibrary adapter 150 beneficially enables the user to continue using a component dynamic library 110 dependent on an initial version of a simulation dynamic library 130 even after simulation dynamic library 130 has been updated to a later version, which would otherwise be incompatible with the component dynamic library 110 without the interlibrary adapter 150.

VII. Dynamic Simulation Loading

Figure 4:
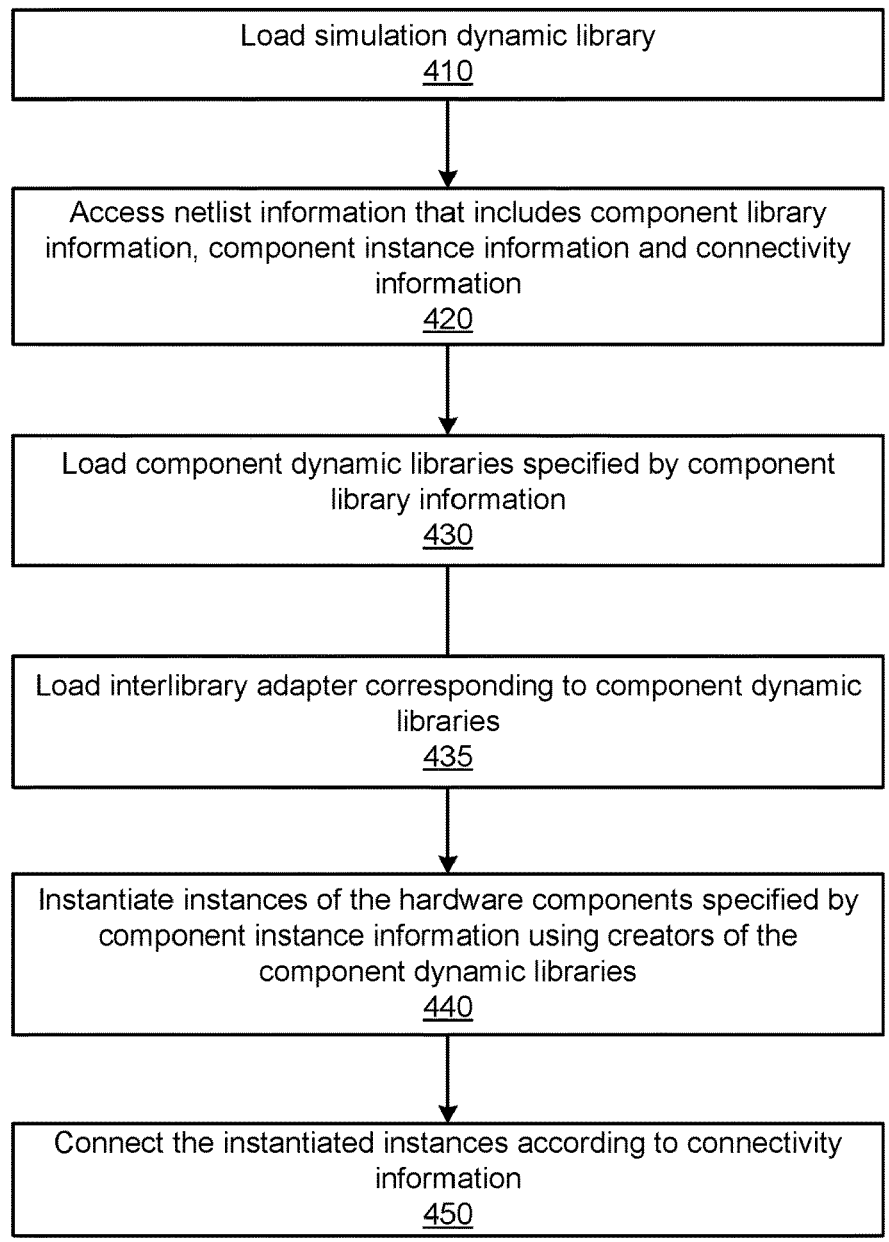
FIG. 4 is a flowchart illustrating an example process for dynamically loading a system simulation, according to an embodiment.

FIG. 4 is a flowchart illustrating an example process for dynamically loading a system simulation 100, according to an embodiment. The steps of the process described in conjunction with FIG. 4 may be performed in different orders than the order described in conjunction with FIG. 4. For example, steps occurring before simulation run-time may occur simultaneously or in sequence. In some embodiments, different and/or additional steps than those described in conjunction with FIG. 4 may be performed.

At simulation run-time, the simulation loader 140 loads 410 the simulation dynamic library 130. The simulation dynamic library 130 provides simulation functionality referenced by the component dynamic libraries 110. In other words, the simulation dynamic library 130 includes simulation library program constructs referenced by the component dynamic libraries 110.

At simulation run-time, the simulation loader 140 begins generating the system simulation 100 by accessing 420 the netlist information 120, which includes component library information (e.g., the shared library list 123), component instance information (e.g., the instance list 125), and connectivity information (e.g., the connectivity list 127). The simulation loader 140 may access 420 the netlist information 120 to begin generating the simulation in response to a command to perform the simulation. For example, the command to perform the simulation is received from a user through a graphical user interface or a command line interface. As another example, the command to perform the simulation is received from a test manager program that coordinates running multiple simulations under varied conditions.

The simulation loader 140 loads 430 the component dynamic libraries 110 specified by the component library information. In one embodiment, the simulation loader 140 identifies un-loaded component dynamic libraries 110 from the shared library list 123 that correspond to one or more instances from the instance list 125. The simulation loader 140 then loads the identified component dynamic libraries 110. For example, the simulation loader 140 uses a loop that is complete when all component dynamic libraries 110 from the shared library list 123 have been loaded.

In one embodiment, the simulation loader 140 loads 430 a component dynamic library 110 by placing the component dynamic library 110 into memory. For example, the simulation loader 140 requests that the operating system of the computer performing the system simulation 100 load the component dynamic library 110 into memory allocated to the system simulation 100. As a consequence of loading the component dynamic library 110, the component creator registrar 117 registers the component dynamic library's component creator 115 with the creator registry 135. The component creator 115 is adapted to create one or more instances of a hardware component from a component model 113 of that hardware component. Registering the component creator 115 places a reference to the component creator 115 (e.g., a memory pointer) in a list of pairs in the creator registry 135. Each pair includes a reference to the component creator 115 and a class name (e.g., the Vendor Library Name Version identifier) of the associated component dynamic library 110 that includes the component creator 115. Since different versions of a component dynamic library 110 have different VLNV identifiers, the creator registry 135 may contain multiple versions of a component dynamic library 110. For example, a system simulation 100 may include an older version and a newer version of the same hardware component to compare performance. If the component dynamic library 110 is dependent on other embedded files, then the component creator registrar 117 embeds pointers to the embedded files in the component dynamic library's entry in the creator registry 135.

The simulation loader 140 loads 435 one or more interlibrary adapters 150 corresponding to the simulation dynamic library 130. An interlibrary adapter 150 provides compatibility between one or more component dynamic libraries 110 and a simulation library application binary interface (ABI) of the simulation dynamic library 130. In one embodiment, the interlibrary adapter 150 includes a component library-facing ABI 154 and a mapping between the component library-facing ABI 154 and the simulation library application binary interface. The interlibrary adapter 150 takes as input simulation dynamic library calls (i.e., dependencies on the simulation dynamic library 130 by a component dynamic library 110) and returns the output of the simulation dynamic library 130 in response to the simulation dynamic library call. For example, the interlibrary adapter 150 includes instructions to, during simulation run-time, 1) receive input variables to a simulation function provided by the simulation dynamic library 130 at input registers specified by the component library-facing ABI 154, 2) move the input variables from the input registers specified by the component library-facing ABI 154 to registers specified by the simulation library ABI 156, 3) pass control to the simulation function provided by the simulation dynamic library 130, 4) retrieve an output variable from the simulation function provided by the simulation dynamic library 130 at an output register specified by the simulation library ABI 156, 5) move the output variable from the output register specified by the simulation library ABI 156 to an output register specified by the component library-facing ABI 154, and 6) return control to a function of the component dynamic library 110 that initially called the simulation function provided by the simulation dynamic library 130.

The simulation loader 140 instantiates 440 instances of hardware components specified by the component instance information (e.g., the instance list 125). In one embodiment, the simulation loader 140 identifies un-instantiated instances from the instance list 125. The simulation loader 140 then instantiates the identified instances. The simulation loader 140 may loop over the instances of the instance list 125 until all instances are loaded. The programmatic loop terminates when all instances from the instance list 125 have been loaded.

In one embodiment, the simulation loader 140 instantiates 440 an instance of a hardware component by identifying one or more creators from the creator registry 135 that correspond to the instance. In one embodiment, to identify the component creator 115, the simulation loader 140 identifies a pair from the creator registry 135 that has a class name matching the class name of the associated component dynamic library 110 that models the instantiated hardware component. From the identified pair, the simulation loader 140 retrieves the reference to the component creator 115 (e.g., the memory pointer to the component creator 115), which may be used to retrieve the component creator 115 corresponding to the instance. By invoking the component creator 115, the simulation loader 140 invokes instructions to instantiate 440 the instance of the hardware component. For example, instantiating an instance of a hardware component allocates memory for the instance. The amount of memory allocated for the instance (and the structure of the allocated memory) may depend at least in part of properties of the instance retrieved from the netlist 120.

In one embodiment, as part of instantiating a component, the component creator 115 of an instance (or the simulation loader 140) may register the instance of the hardware component in the instance registry 137. For example, the instance registry 137 is a list of pairs, where each pair includes a class name for the instance and a reference to the instance (e.g., a memory pointer to the instance).

The simulation loader 140 connects 450 the instantiated instances of the hardware components in accordance with the connectivity information (e.g., the connectivity list 127). In one embodiment, the simulation loader 140 identifies un-instantiated connections between instances using the connectivity list 127. For example, entries in the connectivity list 127 specify two instances to connect, the type of connection, and ports of the instances to connect. As another example, the simulation loader 140 invokes a "bind" function between a source port on one instance and a destination port on another instance. Invoking the "bind" function instructs the simulation kernel 133 to forward function calls from the source port to the destination port. The simulation loader 140 then connects 450 the instances based on the connectivity information. To connect 450 the instantiated instances, the simulation loader 140 may loop over the connections of connectivity list 127. The loop terminates when all connections from the connectivity list 127 have been instantiated. Once the instances have been connected, the system simulation 100 is fully generated and is ready for execution.

Dynamically loading the component dynamic libraries 110 advantageously enables modification of a system simulation 100 without completely recompiling all of its components, as is the case for a statically linked system simulation. For example, suppose an error is discovered in the component model 113 of a component dynamic library 110. When substituting an updated version of the component dynamic library 110 in place of the erroneous version of the component dynamic library 110, the authoring tool 190 modifies the reference to the affected component dynamic library 110 in the netlist 120 (e.g., in the shared library list 123) rather than relinking the entire simulation, as in the case for a statically linked system simulation.

VIII. Example Hardware Component Simulation

Figure 5A:
FIGS. 5A-5C are block diagrams illustrating generation of an example simulation, according to an embodiment.
Figure 5B:
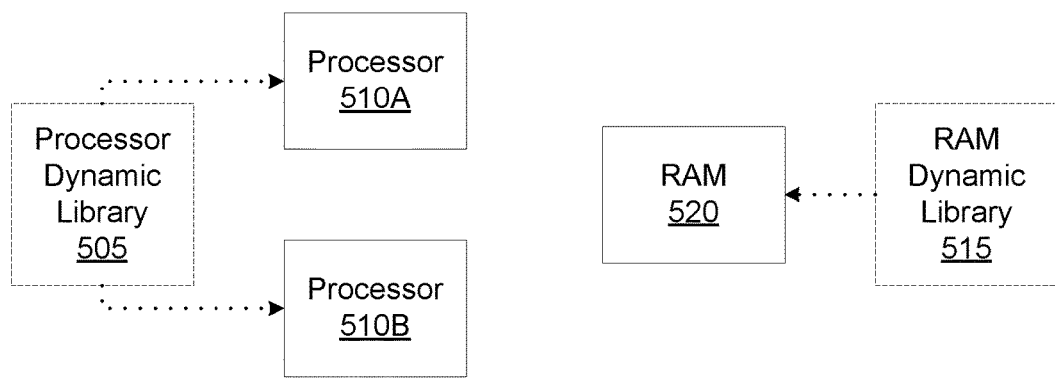
Figure 5C:
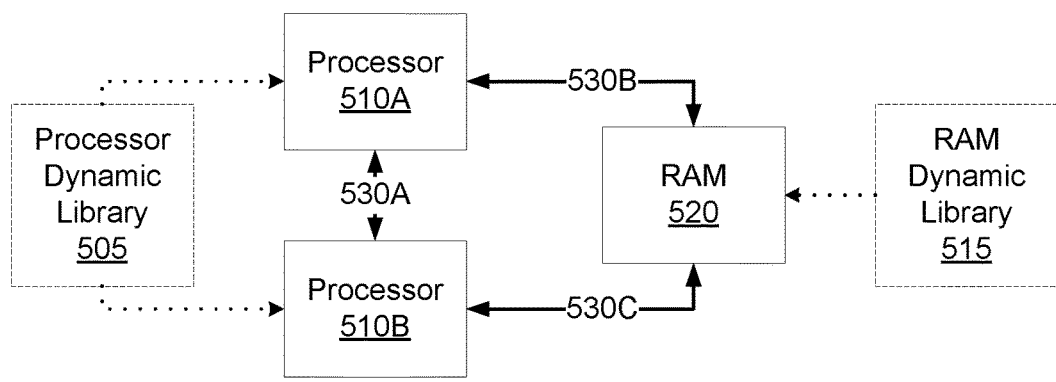

FIGS. 5A-5C are block diagrams illustrating generation of an example system simulation 100, according to an embodiment. FIG. 5A illustrates a first stage of generating a dynamically loaded system simulation 100. In the first stage, the simulation loader 140 identifies the processor dynamic library 505 and the random access memory (RAM) dynamic library 515 as component dynamic libraries 110 used in the system simulation 100 using the shared library list 123. The simulation loader 140 loads the processor dynamic library 505 and the RAM dynamic library 515. As a consequence of loading, a component creator registrar 117 within each of the libraries 505 and 515 registers each library's creator with a creator registry 135.

FIG. 5B illustrates a second stage of generating a dynamically loaded system simulation 100. In the second stage, the simulation loader 140 identifies the processors 510A and 510B and the RAM 520 as instances of hardware components in the system simulation 100 using the instance list 125. The connectivity information indicates that the processors 510A and 510B are described by the component model 113 of the processor dynamic library 505. Likewise, the connectivity information identifies that the RAM 520 is described by the component model 113 of the RAM dynamic library 515. The simulation loader 140 instantiates the processors 510A and 510B and the RAM 520 using their respective creators, which are accessed through the creator registry 135. The component creators 115 of the instantiated instances (or the simulation loader 140) register their respective instances with the instance registry 137.

FIG. 5C illustrates a third stage of generating a dynamically loaded system simulation 100. In the third stage, the simulation loader 140 identifies connectivity information specifying the connections 530A, 530B, and 530C. The example connectivity information specifies that connection 530A is a bus between processors 510A and 510B, and that connections 530B and 530C are first-in, first-out buffers between the RAM 520 and the processor 510A or 510B, respectively. The simulation loader 140 connects the instantiated simulation components at the ports specified in the connectivity information.

IX. Computing Machine Architecture

Figure 6:
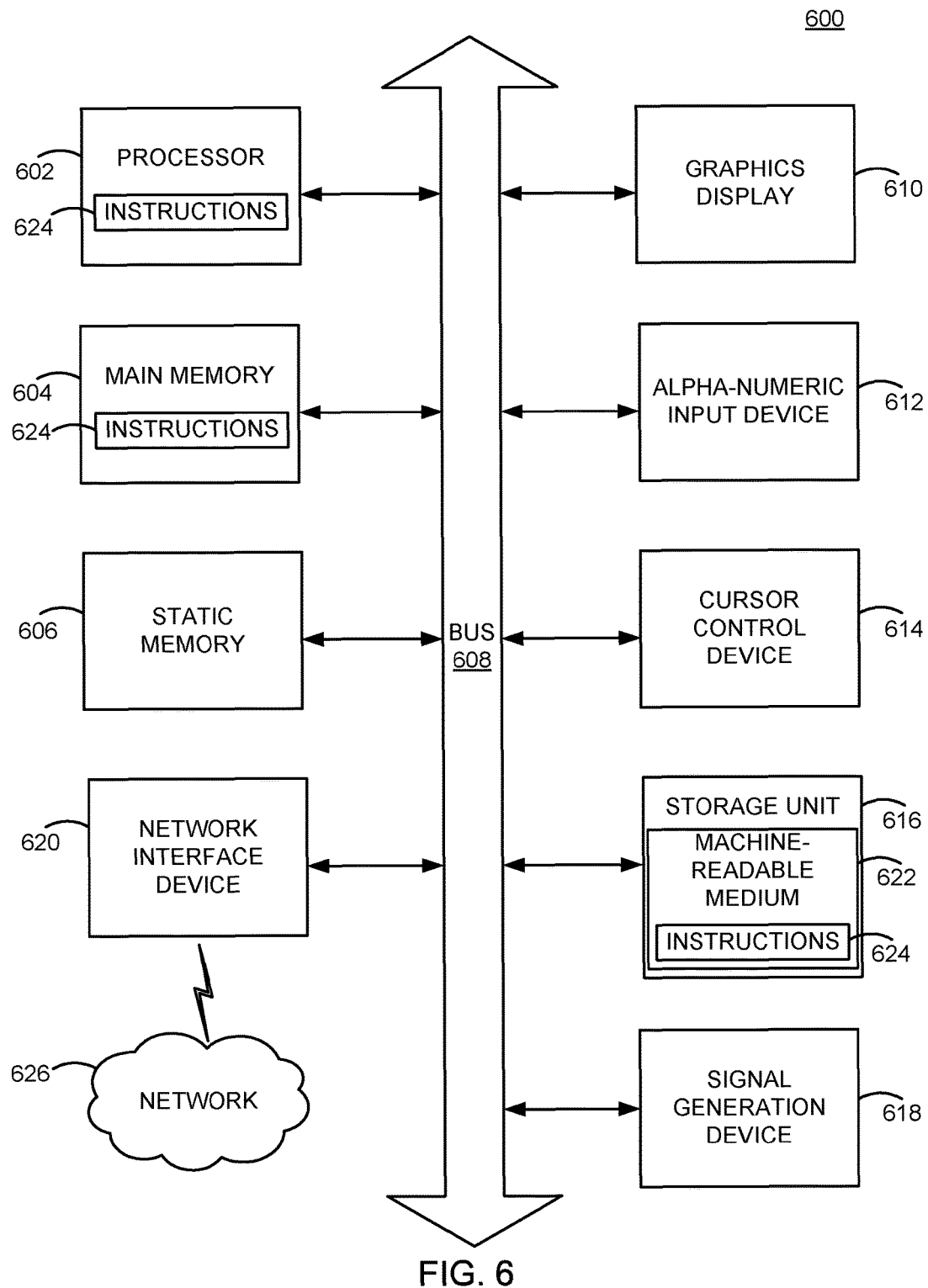
FIG. 6 illustrates components of an example machine able to read instructions from a machine-readable medium and execute them in a processor (or controller), according to an embodiment.

FIG. 6 is a block diagram illustrating components of an example machine able to read instructions from a machine-readable medium and execute them in a processor (or controller). In one embodiment computer system 600 is an example of a host system in which a simulation of a target system may performed using dynamic loading-based simulations.

Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processors 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a non-transitory machine-readable medium 622 (also referred to herein as a computer-readable medium) on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The computer system 600 includes multiple processor cores that can be distributed across one or more of the processors 602. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media. The term "machine-readable medium" may also be referred to as a computer-readable medium.

X. Additional Considerations

The disclosed embodiments beneficially improve the functioning of a computer 600 executing the system simulation 100 by reducing operations needed to modify a system simulation 100, as described throughout the specification. For example, the adapter generator 170 modifies the inter-library adapter 150 in response to changes in the simulation dynamic library 130 in order to avoid rebuilding the component dynamic libraries 110 dependent on the simulation dynamic library 130. The dynamic loading procedure maintains separate namespaces for different dynamic libraries, which enables multiple versions of a component dynamic library 110 to coexist in a system simulation 100. Additionally, the memory monitor 195 beneficially reduces memory usage in the computer 600 by identifying dynamic libraries that are unlikely to be used again in the simulation and unloading those dynamic libraries from the memory.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. One or more steps of the processes or methods described herein (e.g., that illustrated in FIG. 4) are repeated concurrently by multiple threads. Thus, one or more of the steps can be performed serially, in parallel, and/or by a distributed system, in accordance with various embodiments of the invention.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for dynamically loaded system simulations through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method implemented on a computer system, the method comprising:
  generating, at simulation runtime, a system level simulation of a target system corresponding to a system level modeling language, the target system comprising hardware components, wherein generating the system level simulation is based on a netlist that lists the hardware components in the target system and describes a connectivity between the hardware components and describes one or more component libraries that include hardware component models of the hardware components, and wherein generating the system level simulation at simulation runtime comprises:
    dynamically loading one or more of the hardware component models; and
    executing the system level simulation.

2. The method of claim 1, further comprising:
dynamically unloading at least a portion of one of the hardware component models at simulation runtime.

3. The method of claim 1, wherein the at least a portion of one of the hardware component models is unloaded at simulation runtime responsive to determining that the portion is not used during the system level simulation.

4. The method of claim 1, wherein generating the system level simulation at simulation run-time further comprises:
loading the one or more component libraries described by the netlist.

5. The method of claim 4, wherein generating the system level simulation at simulation run-time further comprises:
instantiating instances of the hardware components for the system level simulation based on the loaded component libraries and the hardware components listed in the netlist; and
connecting the instantiated instances of the hardware components based on the connectivity described in the netlist.

6. The method of claim 4, wherein loading the one or more component libraries comprises:
placing the one or more component libraries into memory; and
registering a reference to at least a portion of the one or more component libraries.

7. The method of claim 1, wherein generating the system level simulation corresponding to a system level modeling language comprises generating, at simulation runtime, a system level simulation corresponding to SystemC.

8. The method of claim 1, wherein the hardware component model for the corresponding hardware component includes variables that represent a state of the hardware component, parameters that describe properties of the hardware components that are invariant during execution of the system level simulation, and (c) functions that modify or retrieve the state of the hardware component.

9. The method of claim 1, wherein the hardware component model for the corresponding hardware component describe the hardware component at a transistor level, at a digital circuit level or at a behavioral level.

10. The method of claim 1, wherein the netlist describes two or more component libraries that provide different hardware component models of the hardware components, and the different hardware component models provide varying levels of detail, accuracy and/or speed for simulating the hardware components.

11. A non-transitory computer-readable medium comprising instructions executable by one or more processors, the instructions when executed by the one or more processors cause the one or processors to implement operations comprising:
generating, at simulation runtime, a system level simulation of a target system corresponding to a system level modeling language, the target system comprising hardware components, wherein generating the system level simulation is based on a netlist that lists the hardware components in the target system and describes a connectivity between the hardware components and describes one or more component libraries that include hardware component models of the hardware components, and wherein generating the system level simulation at simulation runtime comprises:
dynamically loading one or more of the hardware component models; and
executing the system level simulation.

12. The non-transitory computer-readable medium of claim 11, the operations further comprising:
dynamically unloading at least a portion of one of the hardware component models at simulation runtime.

13. The non-transitory computer-readable medium of claim 11, wherein the at least a portion of one of the hardware component models is unloaded at simulation runtime responsive to determining that the portion is not used during the system level simulation.

14. The non-transitory computer-readable medium of claim 11, wherein generating the system level simulation at simulation run-time further comprises:
loading the one or more component libraries described by the netlist.

15. The non-transitory computer-readable medium of claim 14, wherein generating the system level simulation at simulation run-time further comprises:
instantiating instances of the hardware components for the system level simulation based on the loaded component libraries and the hardware components listed in the netlist; and
connecting the instantiated instances of the hardware components based on the connectivity described in the netlist.

16. The non-transitory computer-readable medium of claim 14, wherein loading the one or more component libraries comprises:
placing the one or more component libraries into memory; and
registering a reference to at least a portion of the one or more component libraries.

17. The non-transitory computer-readable medium of claim 11, wherein generating the system level simulation corresponding to a system level modeling language comprises generating, at simulation runtime, a system level simulation corresponding to SystemC.

18. The non-transitory computer-readable medium of claim 11, wherein the hardware component model for the corresponding hardware component includes variables that represent a state of the hardware component, parameters that describe properties of the hardware components that are invariant during execution of the system level simulation, and (c) functions that modify or retrieve the state of the hardware component.

19. The non-transitory computer-readable medium of claim 11, wherein the hardware component model for the corresponding hardware component describe the hardware component at a transistor level, at a digital circuit level or at a behavioral level.

20. The non-transitory computer-readable medium of claim 11, wherein the netlist describes two or more component libraries that provide different hardware component models of the hardware components, and the different hardware component models provide varying levels of detail, accuracy and/or speed for simulating the hardware components.

* * * * *